US008345763B2

United States Patent
Chen et al.

(10) Patent No.: US 8,345,763 B2
(45) Date of Patent: Jan. 1, 2013

(54) MOTION COMPENSATION METHOD AND INTEGRATED CIRCUIT UTILIZING THE SAME

(75) Inventors: Chun-Chia Chen, Hsinchu (TW);
Chi-Cheng Ju, Hsinchu (TW);
Chih-Ming Wang, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 1294 days.

(21) Appl. No.: 12/104,583

(22) Filed: Apr. 17, 2008

(65) Prior Publication Data
US 2009/0135909 A1     May 28, 2009

Related U.S. Application Data

(60) Provisional application No. 60/990,314, filed on Nov. 27, 2007.

(51) Int. Cl.
*H04N 7/12* (2006.01)
(52) U.S. Cl. .............. 375/240.16; 348/699; 375/240.15; 375/240.25; 375/240.26
(58) Field of Classification Search .................. 348/699; 375/240.15, 240.16, 240.25, 240.26
See application file for complete search history.

(56) References Cited

U.S. PATENT DOCUMENTS 6,674,910 B1 * 1/2004 Moon et al. .................. 382/239

OTHER PUBLICATIONS

"RealVideo 8" Video and Audio Technologies, Codec Group, RealNetworks, Inc.; Jul. 20, 2007, Version 2.03.
"RealVideo 9" Video and Audio Technologies, Codec Group, RealNetworks, Inc.; Sep. 6, 2007, Version 1.8.
Hsu, Y.S.; "H.264 Fast Horizontal Line Search Motion Estimation Implemented on Equator DSP;" MA Thesis; Jul. 2004; pp. 1-114.

* cited by examiner

*Primary Examiner* — Sath V Perungavoor
*Assistant Examiner* — Geepy Pe
(74) *Attorney, Agent, or Firm* — McClure, Qualey & Rodack, LLP

(57) ABSTRACT

An integrated circuit capable of motion compensation and a method thereof. The integrated circuit includes a partition unit and a motion compensation unit. The partition unit receives a video block having a predetermined block dimension, and partitions the video block into sub-blocks with a sub-block dimension less than the predetermined block dimension when the video block is on a frame boundary of a video frame. The motion compensation unit, coupled to the partition unit, performs motion compensation on the sub-blocks.

14 Claims, 7 Drawing Sheets

MOTION COMPENSATION METHOD AND INTEGRATED CIRCUIT UTILIZING THE SAME

CROSS REFERENCE

This application claims the benefit of U.S. provisional application Ser. No. 60/990,314 filed Nov. 27, 2007, the subject matter of which is incorporated herein by reference.

BACKGROUND OF THE INVENTION

1. Field of the Invention

The invention relates in general to video coding, and in particular, to a motion compensation method and integrated circuit utilizing the same.

2. Description of the Related Art

Block-based video coding standards such as MPEG 1/2/4 and H.26x achieve data compression by reducing temporal redundancies between video frames and spatial redundancies within a video frame. Encoders conforming to the standards produce a bitstream decodable by other standard compliant decoders.

Each video frame comprises an array of pixels. A macroblock (MB) is a group of pixels, typically 16×16 pixels. The 16×16 block can be further partitioned into block sizes of 16×8, 8×16, 8×8, 8×4, 4×8, or 4×4 in some video coding standards. It is common to estimate movement of an image between frames on a macroblock basis, referred to as motion estimation, which typically comprises comparing a macroblock in the current frame to a number of macroblocks from other reference frames for similarity. The spatial displacement between the macroblock in the current video frame and the most similar macroblock in the reference frames is a motion vector (MV). Motion vectors may be estimated to within a fraction of a pixel, by interpolating pixels from the reference frames.

Motion compensation refers to the reverse process of reconstructing a video frame from a reference frame and the motion vector in a video decoder. RV9 RealVideo specification includes an MV clipping scheme for the motion compensation. FIGS. 1a and 1b show exemplary MV clipping schemes in RealVideo specification RV9, depicting the MV of a 4×4 chrominance component in a macroblock being clipped at right and bottom respectively. RV9 specification provides two MV clipping schemes, including an UMV clipping scheme and a (4×4) block MV clipping scheme. The UMV clipping scheme extends the border pixels to four directions limitlessly, while the (4×4) block MV clipping scheme extends limited extended pixels around the frame boundary of a video frame. In the (4×4) block MV clipping scheme, when the sub-block of a chrominance component is at the outside of the frame boundaries, RV9 specification adjusts the MV such that the sub-block is only less than 1 pixel outside of the right (FIG. 1a) and bottom (FIG. 1b) boundaries, resulting inaccurate reconstructed image.

Thus, a need exists for a motion compensation method for a motion decoder to determine an accurate motion vector for motion compensation near a frame boundary in real video applications.

BRIEF SUMMARY OF THE INVENTION

A detailed description is given in the following embodiments with reference to the accompanying drawings.

A motion compensation method, comprising receiving a video block having a predetermined block dimension, partitioning the video block into sub-blocks with a sub-block dimension less than the predetermined block dimension, when the video block is on a frame boundary of a video frame, and performing motion compensation on the sub-blocks.

According to another embodiment of the invention, a motion compensation method is disclosed, comprising receiving a control signal to select between an unrestricted motion vector (UMV) mode and a split restricted MV clipping mode, receiving a video block, performing motion compensation on a basis of video block during the UMV mode, and splitting the video block into two MV clipping sub-blocks, shifting one MV clipping sub-block towards the left or top of a frame boundary when the video block is on the frame boundary of a video frame, and performing motion compensation on the shifted and the other MV clipping sub-blocks during the split restricted MV clipping mode.

According to yet another embodiment of the invention, an integrated circuit capable of motion compensation is provided, comprising a partition unit and a motion compensation unit. The partition unit receives a video block having a predetermined block dimension, and partitions the video block into sub-blocks with a sub-block dimension less than the predetermined block dimension when the video block is on a frame boundary of a video frame. The motion compensation unit, coupled to the partition unit, performs motion compensation on the sub-blocks.

According to another embodiment of the invention, an integrated circuit capable of motion compensation is provided, comprising a controller, an UMV unit, and an MV clipping unit. The controller generates a control signal to select between an unrestricted motion vector (UMV) mode and a split restricted MV clipping mode. The UMV unit, coupled to the controller, receives a video block to perform motion compensation thereon when the UMV mode is selected. The MV clipping unit, coupled to the controller, splits the video block into two MV clipping sub-blocks, shifts one MV clipping sub-block towards the left or top of a frame boundary when the video block is on the frame boundary of a video frame, and performs motion compensation on the shifted and the other MV clipping sub-blocks.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figures 1A, 1B:
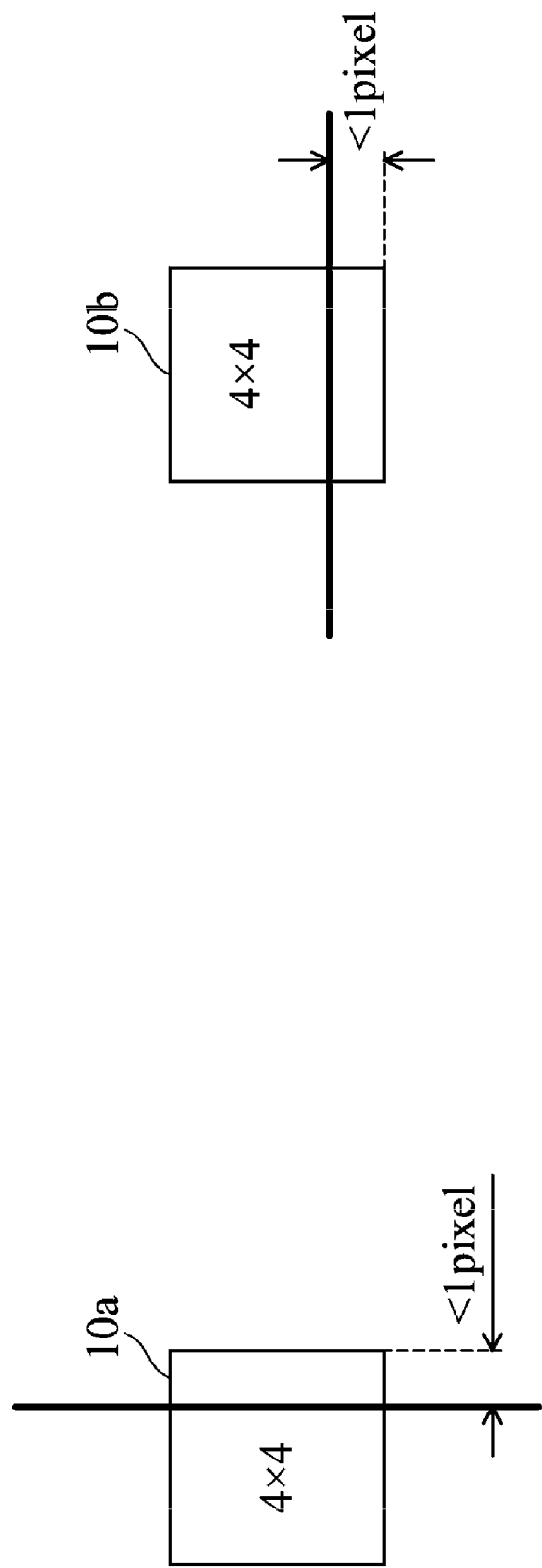
FIGS. 1a and 1b show exemplary MV clipping operations in RealVideo specification RV9.
Figure 2:
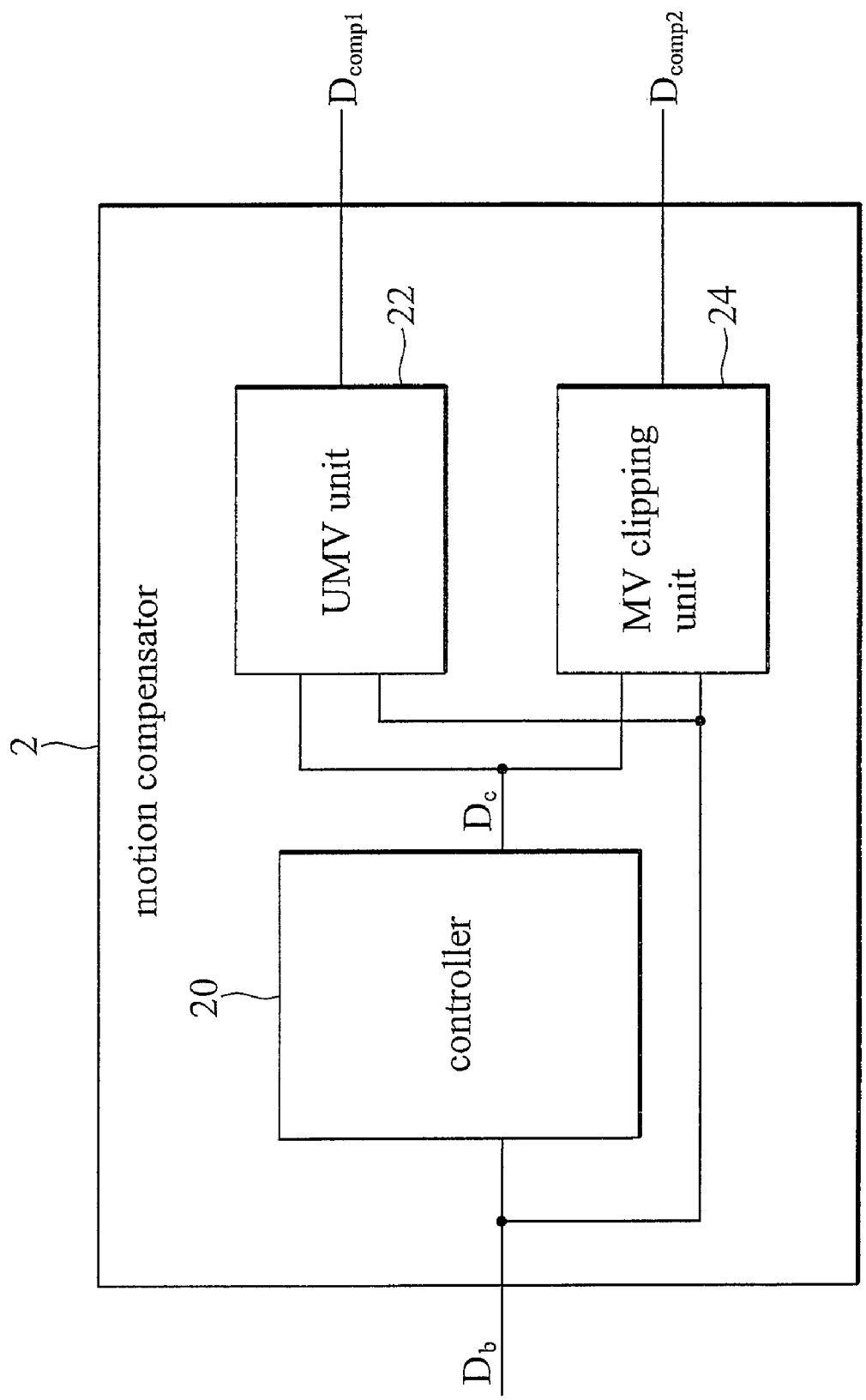
FIG. 2 is a block diagram of an exemplary video decoder according to the invention.

FIG. 2 is a block diagram of an exemplary video decoder according to the invention, comprising controller 20, UMV unit 22, and MV clipping unit 24. Controller 20 is coupled to UMV unit 22 and MV clipping unit 24.

Video decoder 2 is capable of performing motion compensation by normal UMV mode and split restricted MV clipping mode. Controller 20 receives video block $D_b$ to generate control signal $D_c$ to select between an unrestricted motion vector (UMV) mode and a split restricted MV clipping mode. UMV unit 22 and MV clipping unit 24 then obtain control signal $D_c$ such that only one is activated according to the MC mode. UMV unit 22 receives video block $D_b$ to perform motion compensation thereon when the UMV mode is selected. MV clipping unit 24 splits video block $D_b$ into two MV clipping sub-blocks, shifts one MV clipping sub-block towards the left or top of a frame boundary when the video block is on the frame boundary of a video frame, and performs motion compensation on the shifted and the other MV clipping sub-blocks.

Figure 3:
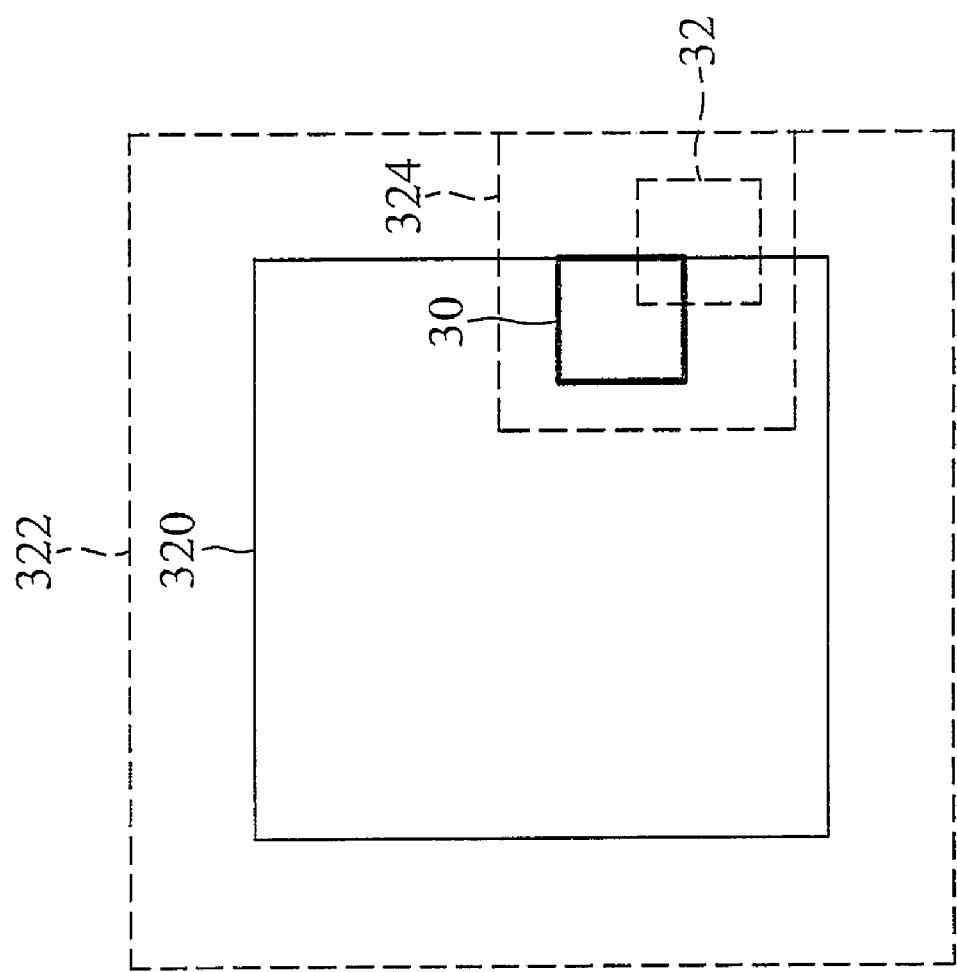
FIG. 3 shows an exemplary UMV scheme incorporated in the video decoder FIG. 2.

Controller 20 determines control signal $D_c$ based on the data type of video block $D_b$. For example, controller 20 generates control signal $D_c$ to enable the UMV mode when video block $D_b$ belongs to the MPEG data, and enables the split restricted MV clipping mode when video block $D_b$ is the RealVideo data. Video block $D_b$ is a macroblock typically comprising 2 macroblock partitions including luminance (luma) and chrominance (chroma) components, in some embodiments, the block size of the luma component is twice that of the chroma component. For example, a 16×16 macroblock comprises two (16×8) or (8×16) macroblock partitions, each macroblock partition include (8×8) luma component and (4×4) chroma component UMV unit 22 performs the normal UMV scheme as shown in FIG. 3. In a normal UMV scheme, video decoder 2 performs motion compensation on the basis of each macroblock partition, receiving MVs for each macroblock partition to obtain a current block partition. FIG. 3 shows a reference frame 320 extended in four directions including top, left, right and bottom by repeating, or "padding", the border pixels to the extended area. A video encoder (not shown) estimates the displacement between the current block 32 and reference block 30 that is partially outside of the frame boundary of the reference frame as the motion vector (MV). For example, the video encoder computes an error between current block 32 and each reference block candidate in search window 324, determines the smallest error for the best matched block (reference block 30), and estimates the displacement therebetween for the motion vector to be transmitted to 2. The error between the current block 32 and each reference block candidate may be evaluated by a sum of absolute difference (SAD) between each pixel in block 32 and each reference block candidate. UMV unit 22 receives the motion vector to reconstruct an approximated current block by adding the MV pointing to the outside of the frame boundary to the reference block. The motion vector ($MV_x$, $MV_y$) may be, for example (3, −3), indicating current block 32 is displaced 3 pixels horizontally and −3 pixels vertically from reference block 30. The UMV prediction technique increases the coding efficiency of the boundary blocks for motion estimation and compensation, resulting in an improved image.

Figure 4B:
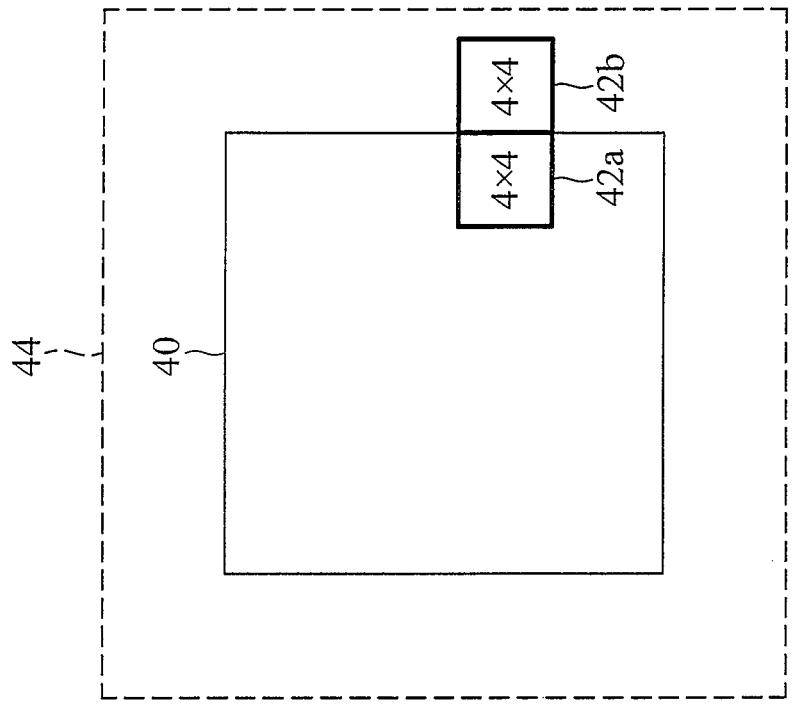
FIGS. 4a through 4c show an exemplary MV clipping scheme incorporated in the video decoder FIG. 2.
Figure 4A:
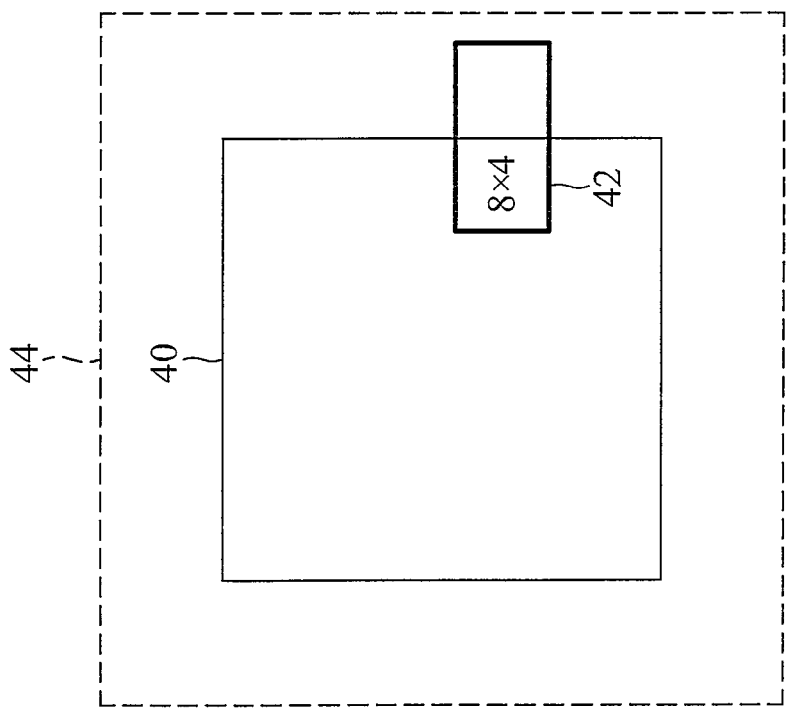
Figure 4C:
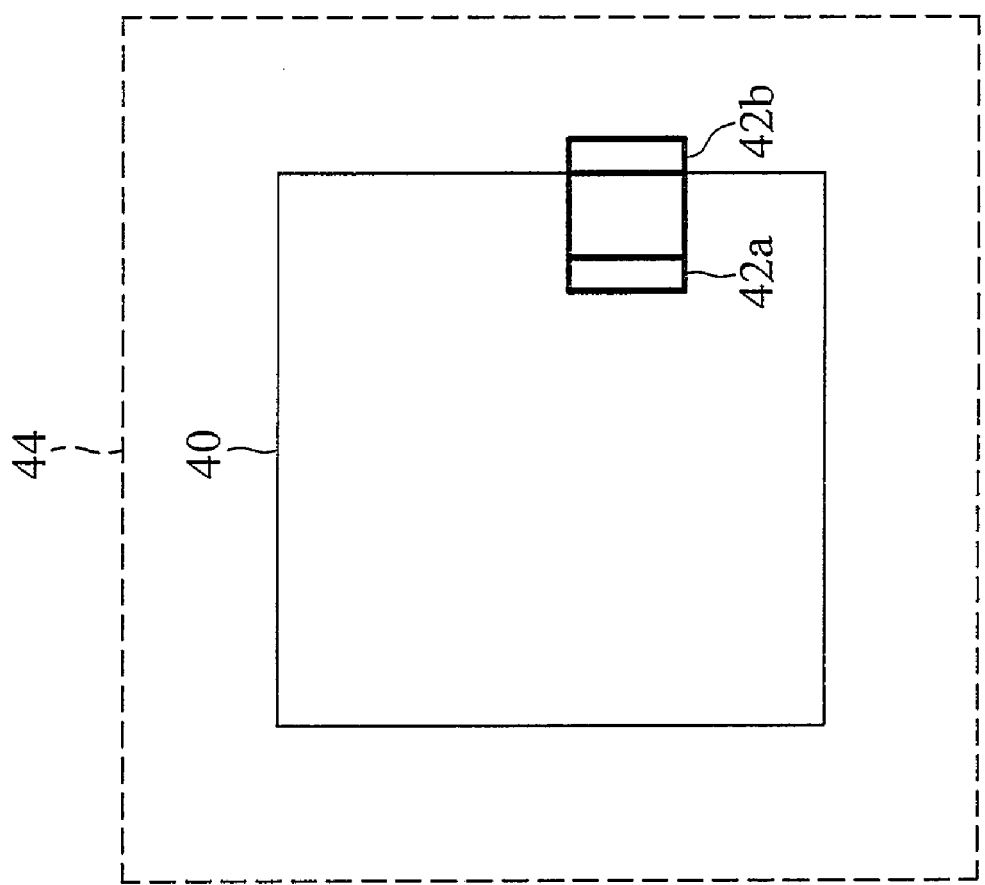

MV clipping unit 24 performs MV clipping scheme compliant with RealVideo specification RV9 when receiving a chroma component on a frame boundary, as shown in FIGS. 4a through 4c. MV clipping unit 24 receives the (8×4) chroma component 42 (FIG. 4a), splits (8×4) chroma components into two (4×4) sub-blocks 42a and 42b (FIG. 4b), shifts the (4×4) sub-block outside of the frame boundary to the left or top by a predetermined distance (FIG. 4c), and performing motion compensation on MV clipping sub-blocks 42a and 42b. The sub-blocks on the frame boundary are shifted up to 3 pixels (predetermined distance) upwards and leftwards. The MV clipping scheme is only applied on chroma components, and can be represented by the following algorithm:

```
For each video block {
  calculate motion vectors of the video block; and
  For each MV clipping sub-block {
    TRUNCATE_LO(mvxF, (crWidth – xRefPos – 3) *
    INTERP_FACTOR – 1, lo);
    TRUNCATE_LO(mvyF, (crHeight – yRefPos – 3) *
    INTERP_FACTOR – 1, lo);
  }
}
Function TRUNCATE_LO(val, lim, tmp)
(tmp) = (lim);
if ((tmp) < (val))
    (val) = (tmp),
``` where the MV clipping sub-block is an unit for MV clipping, mvxF is a backward motion vector along the horizontal direction, mvyF is the backward motion vector along the vertical direction, crWidth is the width of the video block, crHeight is the height of the video block, xRefPos is the leftmost of the sub-block, yRefPos is the topmost of the sub-block, INTERP_FACTOR is an interpolation fractional factor, and lo, tmp, lim, val are temporary variables.

Figure 5:
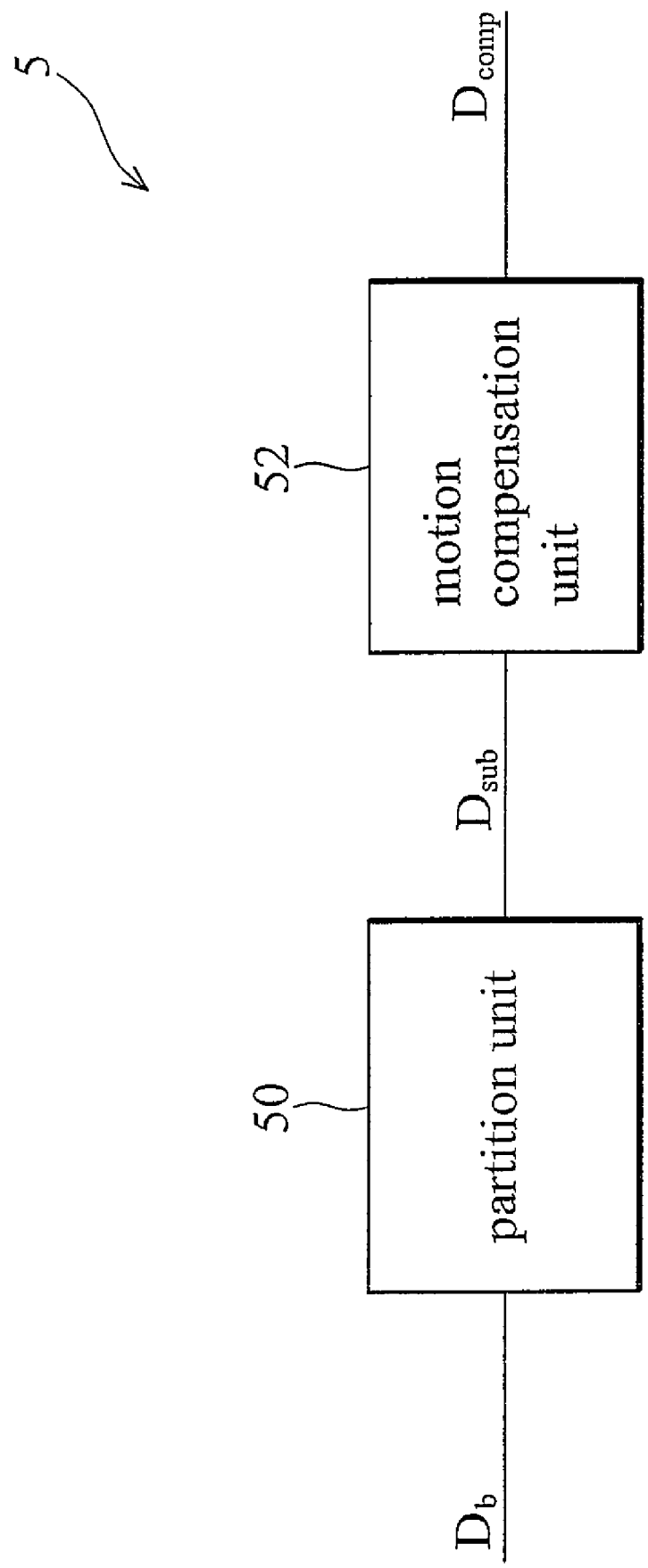
FIG. 5 is a block diagram of an exemplary MV clipping unit in FIG. 2.

FIG. 5 is a block diagram of an exemplary MV clipping unit in FIG. 2. MV clipping unit 5 comprises partition unit 50 and a motion compensation unit 52 coupled thereto. Partition unit 50 receives video block $D_b$ having a predetermined block dimension, and partitions video block $D_b$ into sub-blocks with a sub-block dimension less than the predetermined block dimension when the video block is on a frame boundary of a video frame. For examples, the predetermined block dimension may be (8×4) pixels, and the sub-block dimension may be (4×4), (2×2), (2×4), or (2×4) pixels. Motion compensation unit 52 then performs motion compensation on the sub-blocks to generate reconstructed video block $D_{comp}$. For examples, video block $D_b$ is a chroma component having the predetermined block dimension of (8×4), when the chroma component covers the frame boundary of the video, frame partition unit 50 partitions the chroma component to provide two (4×4) sub-blocks and motion compensation unit 52 performs motion compensation on the sub-blocks so that the MVs thereof are not changed.

Figure 6:
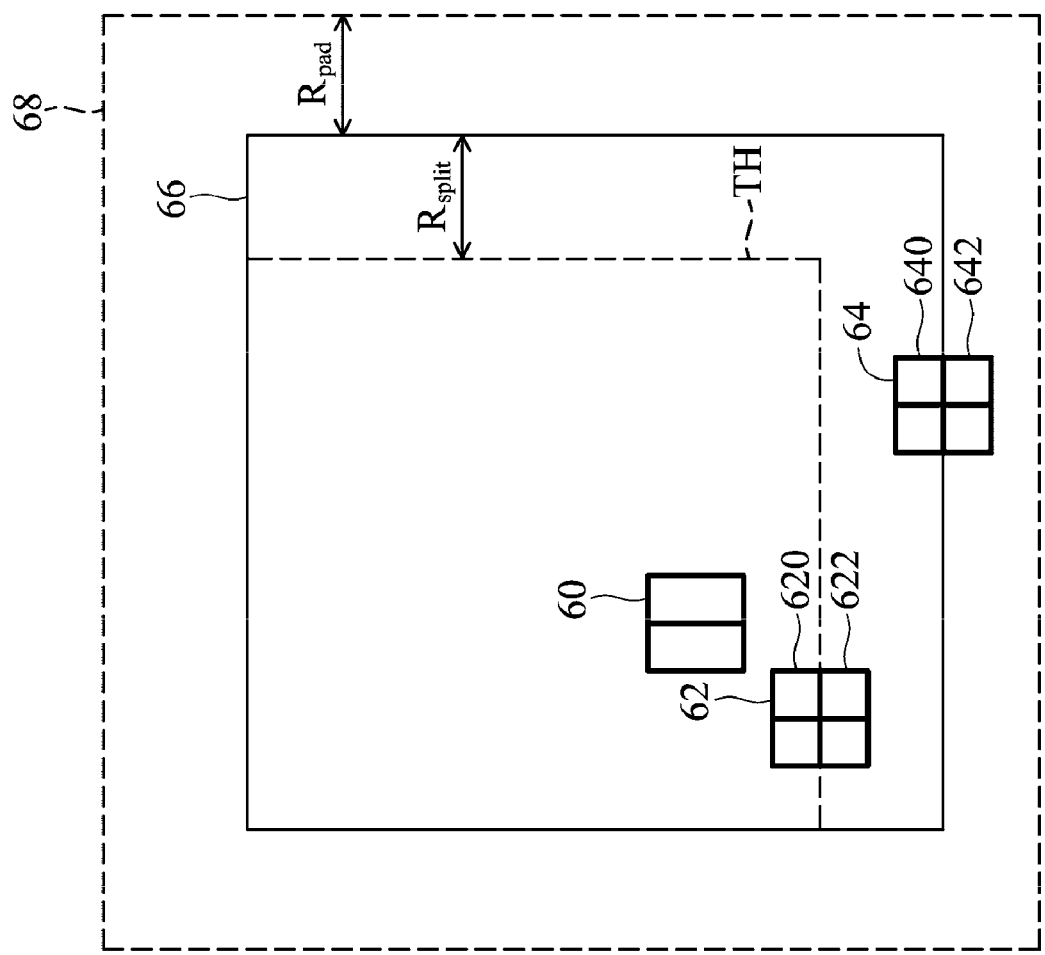
FIG. 6 shows an exemplary motion compensation scheme according to the invention.

FIG. 6 shows an exemplary motion compensation scheme according to the invention, incorporating the MV clipping unit in FIG. 5.

When video block $D_b$ is within the coverage of video frame 66, as shown by video block 60, the block partitions remain intact without split for motion compensation to be performed thereon. When video block $D_b$ is close to the frame boundaries, as indicated by video block 62, frame partition unit 50 compares the location of video block 62 with a predetermined threshold TH, splits the block partitions into sub-blocks 620 and 622 when the location of video block 62 exceeds predetermined threshold TH, and motion compensation unit 52 performs motion compensation on the split sub-blocks 620 and 622 to produce the reconstructed current block 62. When video block $D_b$ is on the right or bottom frame boundaries, as shown by block 64, frame partition unit 50 splits the block partitions into sub-blocks 640 and 642 so that the MVs for both sub-blocks remains identical, and motion compensation unit 52 performs motion compensation on the split sub-blocks 640 and 642 to produce the reconstructed current block 64. Partition unit 50 may determine video block $D_b$ is on the right or bottom frame boundaries by splitting video block $D_b$ into two MV clipping sub-blocks (not shown), adjusting the MV towards the left or top when the sub-block is on the right or bottom frame boundaries of the video frame, and performing the sub-block partition when the MV is adjusted.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of motion compensation, comprising:
   receiving a control signal to select between an unrestricted motion vector (UMV) mode and a split restricted MV clipping mode;
   receiving a video block;
   performing motion compensation on a basis of video block during the UMV mode; and
   during the split restricted MV clipping mode, splitting the video block into two MV clipping sub-blocks and shifting one MV clipping sub-block towards left or top of a frame boundary when the video block is on the frame boundary of a video frame, and performing motion compensation on the shifted and the other MV clipping sub-blocks.

2. The method of claim 1, wherein the splitting, shifting and performing motion compensation during the split restricted MV clipping mode comprises:
   calculating motion vectors of the video block, for each video block;
   for each clipping sub-block, using the following equations:

$$mvxF=(crWidth-xRefPos-3)*INTERP\_FACTOR-1;$$

when lo<mvxF, then mvxF=lo;
   and, $$mvyF=(crHeight-yRefPos-3)*INTERP\_FACTOR-1;$$

when lo<mvyF, then mvyF=lo;
   where the MV clipping sub-block is a unit for MV clipping;
     mvxF is a backward motion vector along the horizontal direction;
     mvyF is the backward motion vector along the vertical direction;
     crWidth is the width of the video block;
     crHeight is the height of the video block;
     xRefPos is the leftmost of the sub-block;
     yRefPos is the topmost of the sub-block;
     INTERP_FACTOR is an interpolation fractional factor;
     and lo is a temporary variable.

3. The method of claim 1, further comprising determining the control signal based on the data type of the video block.

4. The method of claim 1, wherein the video block has a predetermined block dimension, and the method further comprising partitioning the video block into sub-blocks with sub-block dimension less than the predetermined block dimension and performing motion compensation on the sub-blocks during the split restricted MV clipping mode, when the video block is on the frame boundary of the video frame.

5. The method of claim 4, wherein the partition step comprises partitioning the video block into the sub-blocks when the video block is on right or bottom frame boundaries of the video frame.

6. The method of claim 4, wherein the performing motion compensation on the shifted and the other MV clipping sub-blocks step comprises performing motion compensation on the shifted and the other MV clipping sub-blocks to generate two motion vectors, and the partition step comprises partitioning the video block when the two motion vectors from the MV clipping are different.

7. The method of claim 4, wherein the partition step comprises partitioning the video block when location of the video block exceeds a predetermined boundary threshold.

8. An integrated circuit capable of motion compensation, comprising:
   a controller, generating a control signal to select between an unrestricted motion vector (UMV) mode and a split restricted MV clipping mode;
   an UMV unit, coupled to the controller, receiving a video block to perform motion compensation thereon when the UMV mode is selected; and
   an MV clipping unit, coupled to the controller, when the split restricted MV clipping mode is selected, splitting the video block into two MV clipping sub-blocks and shifting one MV clipping sub-block towards left or top of a frame boundary when the video block is on the frame boundary of a video frame, and performing motion compensation on the shifted and the other MV clipping sub-blocks.

9. The integrated circuit of claim 8, wherein the MV clipping unit performs according to the follows:
   calculating motion vectors of the video block, for each video block;
   for each clipping sub-block, using the following equations:

$$mvxF=(crWidth-xRefPos-3)*INTERP\_FACTOR-1;$$

when lo<mvxF, then mvxF=lo;
   and, $$mvyF=(crHeight-yRefPos-3)*INTERP\_FACTOR-1;$$

when lo<mvyF, then mvyF=lo;
   where the MV clipping sub-block is a unit for MV clipping;
     mvxF is a backward motion vector along the horizontal direction;
     mvyF is the backward motion vector along the vertical direction;
     crWidth is the width of the video block;
     crHeight is the height of the video block;
     xRefPos is the leftmost of the sub-block;
     yRefPos is the topmost of the sub-block;
     INTERP_FACTOR is an interpolation fractional factor;
     and lo is a temporary variable.

10. The integrated circuit of claim 8, wherein the controller further determines the control signal based on the data type of the video block.

11. The integrated circuit of claim 8, wherein the video block has a predetermined block dimension, and the integrated circuit further comprising a partition unit, coupled to the controller, partitioning the video block into sub-blocks with sub-block dimension less than the predetermined block dimension and performing motion compensation on the sub-blocks during the split restricted MV clipping mode, when the video block is on the frame boundary of the video frame.

12. The integrated circuit of claim 11, wherein the partition unit partitions the video block into the sub-blocks when the video block is on right or bottom frame boundaries of the video frame.

13. The integrated circuit of claim 11, wherein the MV clipping unit performs motion compensation on the shifted and the other MV clipping sub-blocks step comprises performing motion compensation on the shifted and the other MV clipping sub-blocks to generate two motion vectors, and the partition unit partitions the video block when the two motion vectors from the MV clipping are different.

14. The integrated circuit of claim 11, wherein the partition unit partitions the video block when location of the video block exceeds a predetermined boundary threshold within the frame boundary.

* * * * *